United States Patent [19]
Nabkel et al.

[11] Patent Number: 6,009,163
[45] Date of Patent: *Dec. 28, 1999

[54] METHOD AND SYSTEM FOR REGULATING INCOMING CALLS FROM MULTIPLE POINTS OF ORIGINATION

[75] Inventors: Jafar S. Nabkel, Boulder; Patrick M. Cuddihy, Nederland; Gregory W. Bruening, Boulder, all of Colo.

[73] Assignees: U S West, Inc., Denver; MediaOne Group, Inc., Englewood, both of Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/888,023

[22] Filed: Jul. 3, 1997

[51] Int. Cl.$^6$ .............................. H04Q 3/64; H04M 3/42
[52] U.S. Cl. .......................... 379/266; 379/207; 379/220; 379/265; 379/309
[58] Field of Search ...................................... 379/219, 220, 379/221, 207, 265, 266, 309, 45, 49

[56] References Cited

U.S. PATENT DOCUMENTS

| | | | |
|---|---|---|---|
| 5,291,552 | 3/1994 | Kerrigan et al. | 379/266 |
| 5,299,259 | 3/1994 | Otto | 379/266 |
| 5,323,444 | 6/1994 | Ertz et al. | 379/49 |
| 5,404,350 | 4/1995 | DeVito et al. | 379/45 |
| 5,546,452 | 8/1996 | Andrews et al. | 379/219 |
| 5,740,238 | 4/1998 | Flockhart et al. | 379/266 |
| 5,742,675 | 4/1998 | Kilander et al. | 379/266 |
| 5,754,639 | 5/1998 | Flockhart et al. | 379/266 |
| 5,848,143 | 12/1998 | Andrews et al. | 379/219 |
| 5,878,130 | 3/1999 | Andrews et al. | 379/219 |

*Primary Examiner*—Scott Wolinsky
*Attorney, Agent, or Firm*—Brooks & Kushman

[57] ABSTRACT

A method and system for regulating the flow of calls in a communications network. At least one calling area is assigned to each call response center of each service provider. Call regulating functionality is provided in communication with each call response center of each service provider and includes a set of parameters assigned to each calling area served by the call response center as well as a corresponding call regulating algorithm for the assigned calling areas. The call regulating functionality is operative to detect a call from a calling party to a service provider, determine the assigned calling area of the calling party for that service provider, determine the call response center and determine the current values of the assigned parameters for the calling areas assigned to the call response center. Based on these values and the call regulating algorithm, a decision is made whether to proceed with the call to the call response center, route the call to a corresponding holding queue, or route a call previously held in a holding queue.

47 Claims, 4 Drawing Sheets

METHOD AND SYSTEM FOR REGULATING INCOMING CALLS FROM MULTIPLE POINTS OF ORIGINATION

TECHNICAL FIELD

This invention relates to a method and system for regulating the flow of calls to service providers such as, for example, customer service centers, utilities, ticket ordering services, radio stations and Public Safety Answering Points (PSAP's).

BACKGROUND ART

Anyone who has ever placed a telephone call to a service provider such as, for example, a utility, ticket ordering service or radio station has likely experienced the unpleasant and undesired response of a busy signal. This occurs because the existing communication network, which in most cases is the Public Switched Telephone Network (PSTN), has no mechanism to regulate the flow of such calls. As a result, the network and more particularly, the lines that serve the corresponding call response center of the service provider become overloaded. The caller is therefore unable to reach the desired call response center.

In emergency situations, such as, for example, E-911 calls, network overload poses an even greater danger in that an injured party may not be able to reach a Public Safety Answering Point (PSAP) to receive assistance. As those skilled in the art will recognize, the E-911 emergency response network in use today relies on dedicated trunk circuits from every end office (also called a central office switch or switching center) to regional routing switches and then onto the appropriate Public Safety Answering Point. This architecture is implemented by most regional Bell operating companies.

Typically, each end office is designed to have a minimum of two trunk circuits running from the end office to a regional 911 selective router. In more populated areas, some offices may have more than two trunk circuits depending upon traffic analysis. In any event, these two or more dedicated trunk circuits which are used for E-911 calls only, provide a guaranteed throughput of two simultaneous calls from each area. The trunk circuits also provide a threshold which limits the maximum number of simultaneous calls from a particular area. As readily seen, this limiting capability is necessary to prevent too many calls from an area flooding the PSAP lines, thereby preventing other E-911 calls originating from other areas from being routed to the call response center.

Because the current dedicated trunk network for E-911 calls that is part of the PSTN network is fixed, however, there is no way to adjust the allowed flow of E-911 calls from each area. Specifically, there is no way to adjust the allowed flow to take into consideration expected changes in call activity, i.e., increases or decreases based on times of day, days of the week, or in relationship to major public gatherings. Nor does the existing network permit real time changes in the allowed flow of calls to account for unexpected events such as, for example, mass emergencies i.e. earthquakes, fires, etc.

Historical 911 call data, however, shows that call patterns do exist. For example, during major sporting events, E-911 calls have been found to drop in the area immediately surrounding the sports arena. However, after an event concludes, emergency calls from those areas around the arena have been found to increase dramatically. Similarly, in urban areas, emergency calls from downtown nightclubs and restaurants have been found to be lower during weekday daylight hours, yet increase dramatically during evening hours, especially on the weekends. In short, emergency calls are known to increase in frequency from areas where the public concentrates, especially at places and times where alcohol and activity are involved. In all other areas, where there is less population, the frequency of emergency calls is less.

Unfortunately, the current dedicated trunk network described above, is fixed by the number of physical trunk circuits from each end office. Accordingly, there is no flexibility to allow and control variations in the amount of simultaneous calls from a particular area at a given time to a given call response center.

In short, there is no throttling mechanism provided in the prior art to regulate the flow of non E-911 calls to call response centers of a service provider. While throttling is provided with respect to E-911 calls, it is wholly deficient for the reasons discussed above.

Consequently, a need exists for a method and system for regulating the flow of calls from a calling party to a service provider having one or more call response centers. Such a method and system should be capable of being implemented using the public network switching and signalling and provide dynamic threshold call regulating control to allow a customer to pre-schedule different thresholds of current active calls for each area for different days, times, and events. Such a method and system should further provide an administrator the ability to make real time changes in the above described thresholds to account for unexpected events such as, for example, mass emergencies and other events which result in substantially increased or decreased call activity.

SUMMARY OF THE INVENTION

It is a principal object of the present invention to provide a method and system for regulating the flow of calls from a calling parties to a service provider having one or more call response centers.

It is a further object of the present invention to provide such a method and system wherein dynamic parameters and a call regulating algorithm may be used to regulate incoming calls from multiple points of origination within each region served by each call response center.

It is yet a further object of the present invention to provide such a method and system which allows a customer i.e., an administrator, to custom define multiple calling areas within each region served by a call response center and to specify the control rules and parameters that regulate the flow of calls therefrom.

In carrying out the above objects, there is provided a method of regulating the flow of calls in a communications network having at least one service provider having at least one call response center and at least one switching center in communication with at least one calling party. According to the invention, at least one calling area is assigned to each call response center of each service provider. A service provider i.e. an administrator, may define its own map of areas or sub-areas to be served by each of its call response centers. For example, each switching center within a region may equal an area. Alternatively, the lines off a switching center may be grouped into two or more areas. Still further, an area may encompass multiple switching centers.

Call regulating functionality is provided in communication with each call response center of each service provider. This call regulating functionality includes a set of parameters assigned to each calling area served by each call response center, and a corresponding call regulating algorithm for the assigned calling areas. In a preferred embodiment, these parameters include a total number of current active calls for each calling area assigned to the call response center. Also included is a threshold of currently active calls permitted for each calling area assigned to the call response center. In keeping with the invention, this threshold may be varied for each calling area based on the time of day, day of week, and/or other planned event. The threshold may also be changed in real time by a customer to account for unexpected events such as for example, mass emergencies.

In a preferred embodiment, at least one queue may also be assigned to each calling area to hold calls which, according to the assigned parameters and the call regulating algorithm, are not approved for substantially immediate routing. In such case, an additional set of parameters will also be provided. These parameters include the total count of currently pending calls held in the queue. A threshold of current pending calls which are permitted to be held in queue may also be provided. Like the threshold for current active calls of each calling area, the threshold for current calls held in queue may also be varied based on the time of day, day of week and/or other planned events. This threshold may also be varied by a customer to account for unexpected events.

In a preferred embodiment, the call regulating functionality may reside at or in communication with the switching center itself, such as, for example, an originating or terminating end office switch. Alternatively, the call regulating functionality may reside at or in communication with the call response center. Still further, it may reside at or in communication with an adjunct processor such as, for example, a Service Control Point (SCP) which might be implemented on an Intelligent Network (IN) or Advanced Intelligent Network (AIN).

The call regulating functionality is operative to count the total number of current active calls for each calling area. More specifically, it increments the total number of active calls whenever a call is routed to a call response center. Likewise, it decrements the total whenever a call from a calling party to a call response center ends.

In a preferred embodiment, each calling party is assigned a unique calling number. This calling number is preferably, but not necessarily, a telephone number or other suitable identifier. Each call response center of each service provider, i.e., a utility, radio station, 911, etc. is also assigned at least one calling area having at least one switching center which, in turn, serves at least one calling party.

In operation, a call from a calling party to a service provider having one or more call response centers is detected. Depending upon the embodiment, this step may be accomplished by one or more appropriate triggers programmed at the switching center serving the calling party or any other suitable location. Thereafter, the called number is determined. From this called number, the specific service provider is determined. Based on the calling party's number, the calling area of the calling party for this service provider is then determined by reference to an appropriate database or look-up table which is provided at or in communication with the call regulating functionality. Finally, based on the determined calling area, the specific call response center for the calling party and this service provider is determined. The determined call response center may have the same or different calling number from that dialed by the calling party.

The current values of the parameters assigned to each calling area assigned to each call response center are then determined. Based on these values and the corresponding call regulating algorithm, a decision is made whether to proceed with the call to the call response center. If a queue is provided, a decision is likewise made whether to place the call in queue and/or route a call previously held in queue. In keeping with the invention, this latter decision is also made following a determination of the current values of the relevant parameters and a corresponding call regulating algorithm. Typically, calls placed in queue will be routed on a first in-first out (FIFO) basis. Any suitable prioritization technique may, of course, however, be followed.

In a preferred embodiment, the routing determination is also based on the available capacity of the switching center serving a call response center of the service provider. Accordingly, the number of communication lines of the switching center serving the call response center is determined and considered by the call regulating algorithm.

In keeping with the invention, there is also provided a system for regulating the flow of telephone calls in a communications network. Such a system includes at least one service provider having at least one call response center, and at least one switching center serving at least one calling party. As in the above-described method, the at least one call response center or each service provider has at least one calling area assigned thereto for receiving telephone calls originated by calling parties.

The system further includes call regulating functionality in communication with the at least one call response center of each service provider. As noted above, the call regulating functionality may reside at or in communication with the switching center such as, for example, an originating or terminating end office. The call regulating functionality may also, reside at or in communication with the call response center. Still further, the call regulating functionality may reside at or in communication with an adjunct processor such as, for example, a Service Control Point (SCP) which may be implemented on an Intelligent Network (IN) or Advanced Intelligent Network (AIN). In a preferred embodiment, at least one queue is also provided for each calling area. A database or appropriate look-up table may also be provided as part of the call regulating functionality or as a separate network component provided in communication therewith.

The system of the invention, and more particularly, the call regulating functionality is operative to detect a call from a calling party to a service provider, determine the call response center serving the calling party for that service provider, determine whether to proceed with the call to the call response center, route the call to the corresponding queue and/or route one or more calls previously held in queue. These steps and the applicable parameters whose values determine the call regulating activity are described generally above and in further detail herein.

The above objects, features and advantages of the present invention are readily apparent from the following detailed description of the best modes for carrying out the invention when taken in connection with the accompanying drawings, wherein like reference numerals most correspond to like components.

BEST MODE FOR CARRYING OUT THE INVENTION

System Architecture

Figure 1:
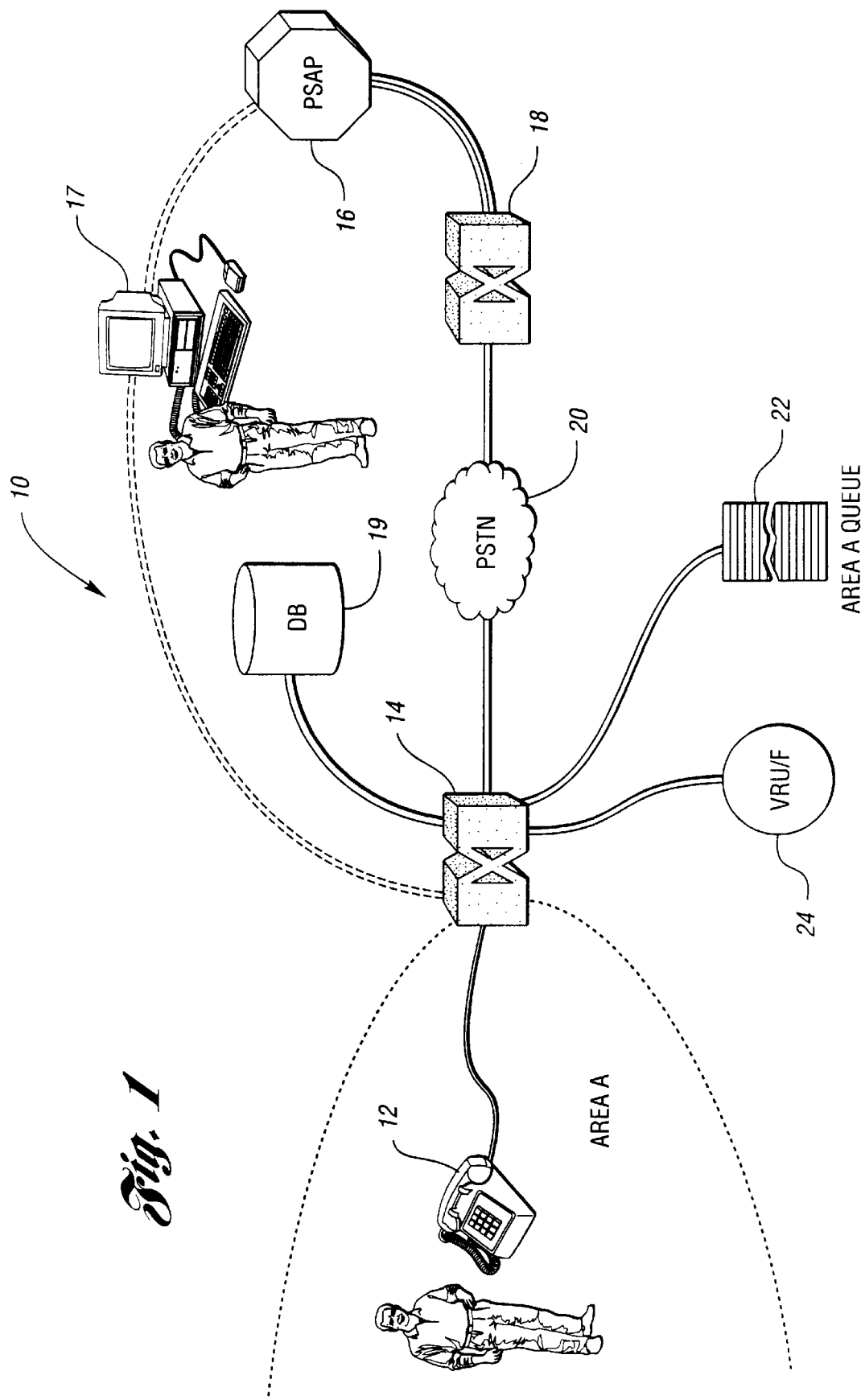
FIG. 1 is a schematic diagram of an exemplary system of the present invention.

Turning now to FIG. 1 of the Drawings, there is shown a first embodiment of a system 10 for carrying out the method of the present invention. System 10 includes at least one calling party 12 provided in communication with a switching center 14 such as, for example, an originating end office switch. Switching center 14, in turn, is provided in communication with a call response center 16 of a service provider. Call response center 16 may, therefore, be an E-911 Public Safety Answering Point (PSAP), a utility, a radio station, a ticket ordering service, or any other customer service center.

Switching center 14 may be provided in direct communication with call response center 16 or via an additional switching center 18 such as, for example, an answering point terminating end office which serves the call response center 16. Switching centers 14 and 18 may be provided in communication with one another via the Public Switched Telephone Network (PSTN) 20 or any other suitable interface such as, for example, the Internet, a private Intranet, etc.

In keeping with the invention, at least one calling area is assigned to each switching center 14. In the example of FIG. 1, only one calling party 12 is shown and, therefore, it is assumed that there is only one calling area "A". According to the invention, however, each call response center 16 is also assigned at least one calling area. A customer, i.e., an administrator of a service provider, may define its own map of areas or sub-areas to be served by each call response center. For example, as shown in FIG. 1, each switching center within a region may equal an area. Alternatively, the lines off a switching center may be grouped into two or more areas. Still further, an area may encompass multiple switching centers. The size and location of calling areas are left up to the discretion of the customer and may comprise several square miles or, perhaps, a single calling party.

Still referring to FIG. 1, switching center 14 is provided with call regulating functionality (not shown). In an alternative embodiment, switching center 18 which serves the call response center 16, may be provided with the call regulating functionality. In yet a further embodiment, call response center 16 or an adjunct thereto (not shown) may be provisioned with the call regulating functionality. Regardless of its physical location, the call regulating functionality includes a set of parameters assigned to each calling area served by the call response center 16, and a corresponding call regulating algorithm for the assigned calling areas. A routing or mapping database (DB) 19 or other suitable look-up table is provided at or in communication with switching center 14.

In FIG. 1, for example, the set of parameters is assigned to calling area "A" as is the corresponding call regulating algorithm. While any number of parameters may be utilized, it is contemplated that such parameters will at least include a total number of current active calls for each calling area assigned to the call response center. It is further contemplated that there will be included a threshold, i.e., a maximum of currently active calls permitted for each calling area assigned to the call response center. By determining the current values of these and other suitable parameters, such as, for example, the available capacity of the switching center 18 serving the call response center 16, a decision is made whether to proceed with the call to the call response center 16.

As shown in FIG. 1, a holding queue 22 may also be provided for holding calls which the system has previously determined may not be routed. If a queue is provided, the current values of additional parameters must also be considered in the regulating determination. For example, it is contemplated that there will be a total count of currently pending calls held in the queue. Still further, it is contemplated that there will be a threshold, i.e., a maximum, of current pending calls which are permitted to be held in queue. Finally, an interactive voice response unit or functionality (VRU/F) 24 may be provided at or in communication with the calling party 12 to communicate the status of the call to the call response center 16. Depending on the embodiment, and more particularly, the location of the call regulating functionality, the holding queue 22 and voice response unit 24 may be provided at or in communication with the call response center 16, a terminating end office 18, an originating end office 14 (as shown) or any other suitable location such as, for example, an adjunct processor as described in further detail below.

The design of FIG. 1 is a basic architecture which applies to the many uses of the invention. These uses include regulation of calls to any call response center of a service provider, including, a customer service center. For example, a radio station running a contest might wish to give callers in each surrounding area an equal opportunity to reach the station on its fixed number of lines. This would, of course, also apply for a ticket ordering service about to open sales for a particular concert with high demand. Still further, similar to the emergency call scenario discussed above, the invention will also allow a public utility such as, for example, a power or gas company, to adjust the threshold parameters to regulate call flow in response to power outages at a specific area, or to announce to callers that a specific problem has been reported.

Figure 2:
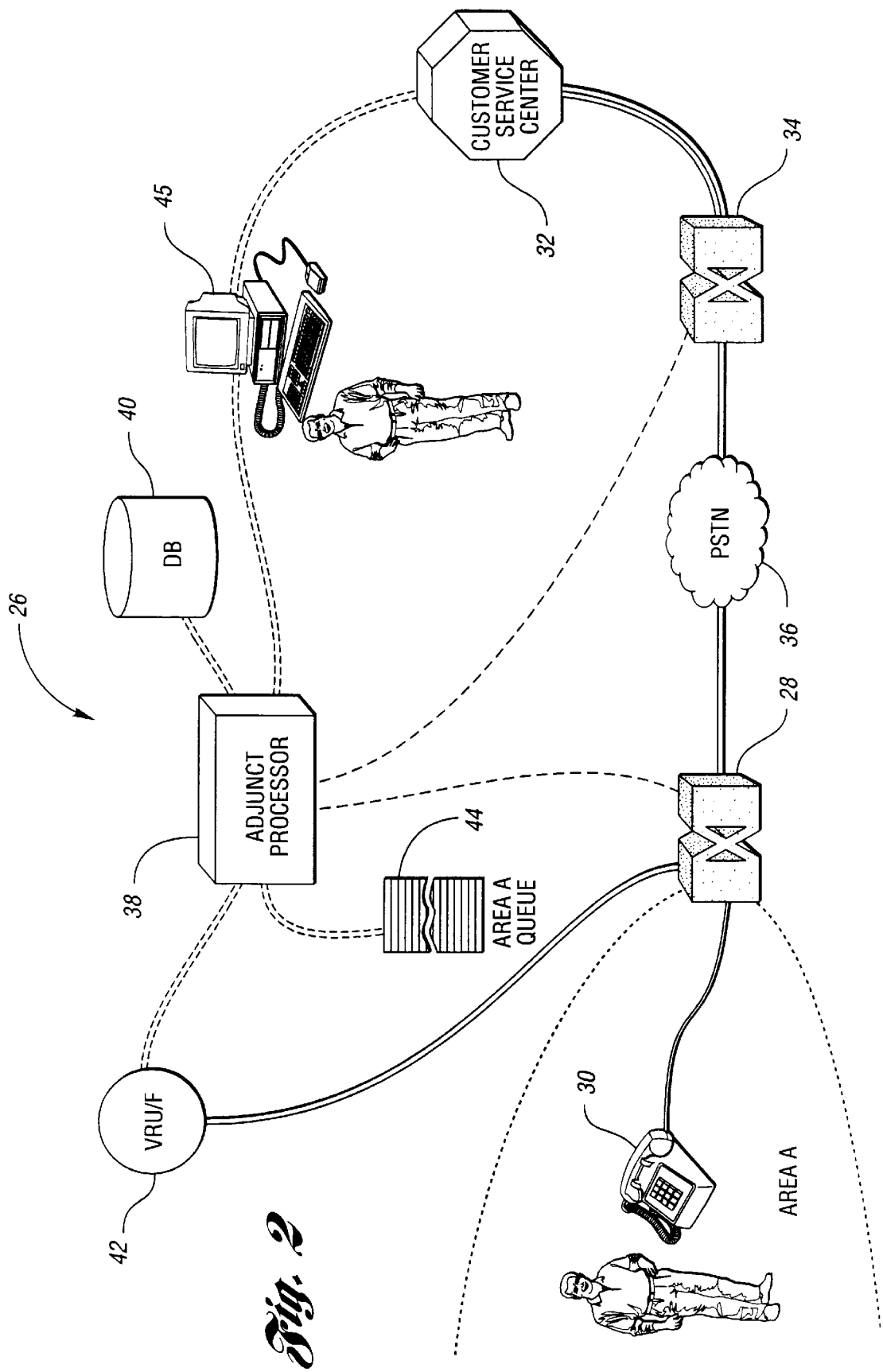
FIG. 2 is a schematic diagram of an alternative embodiment of the system of the present invention.

An alternative embodiment of the system of the present invention is shown in FIG. 2. Like the system of FIG. 1, the system of FIG. 2 which is designated generally by reference numeral 26 also includes at least one switching center 28 such as, for example, an originating end office. Switching center 28 is provided in communication with at least one calling party 30 and a call response center 32 of a service provider. Again, switching center 28 may be provided directly in communication with call response center 32 or via an additional switching center 34 such as, for example, a terminating end office. Switching centers 28 and 34 communicate with one another via the Public Switched Telephone Network (PSTN) 36 or any other suitable network interface, such as, for example, the Internet, a private Intranet, etc.

In the example shown, an adjunct processor 38 is further provided in communication with switching center 28 and/or switching center 34. Adjunct processor 38 may comprise, for example, a Service Control Point (SCP) which may be implemented with an Intelligent Network (IN) or Advanced Intelligent Network (AIN). In such a case, it is contemplated that the adjunct processor will be provided in communication with switching centers 28 and 34 via Signaling System No. 7 (SS7) protocol or a similar messaging protocol and system. As those skilled in the art will recognize, a service control point is a node which contains the required service logic and associated data support necessary to execute required customer services. This functionality as well as the basic architecture of in and AIN is well known to those skilled in the art and need not be discussed in further detail herein.

In contrast to FIG. 1 wherein the call regulating functionality resides at or in communication with switching centers 14 or 18, or perhaps call response center 16, the design of FIG. 2 requires that the call regulating functionality reside at or in communication with adjunct processor 38. A routing and mapping database (DB) 40 or other suitable look-up table is also provided at or in communication with the adjunct processor 38 as is a call handling queue 44. An interactive voice response unit or functionality (VRU/F) 42 is provided at or in communication with the adjunct processor 38 and a switching center in the PSTN 36 such as switching center 28, switching center 34 etc. These components 40 and 42 may reside at or in communication with adjunct processor 38.

Figure 3:
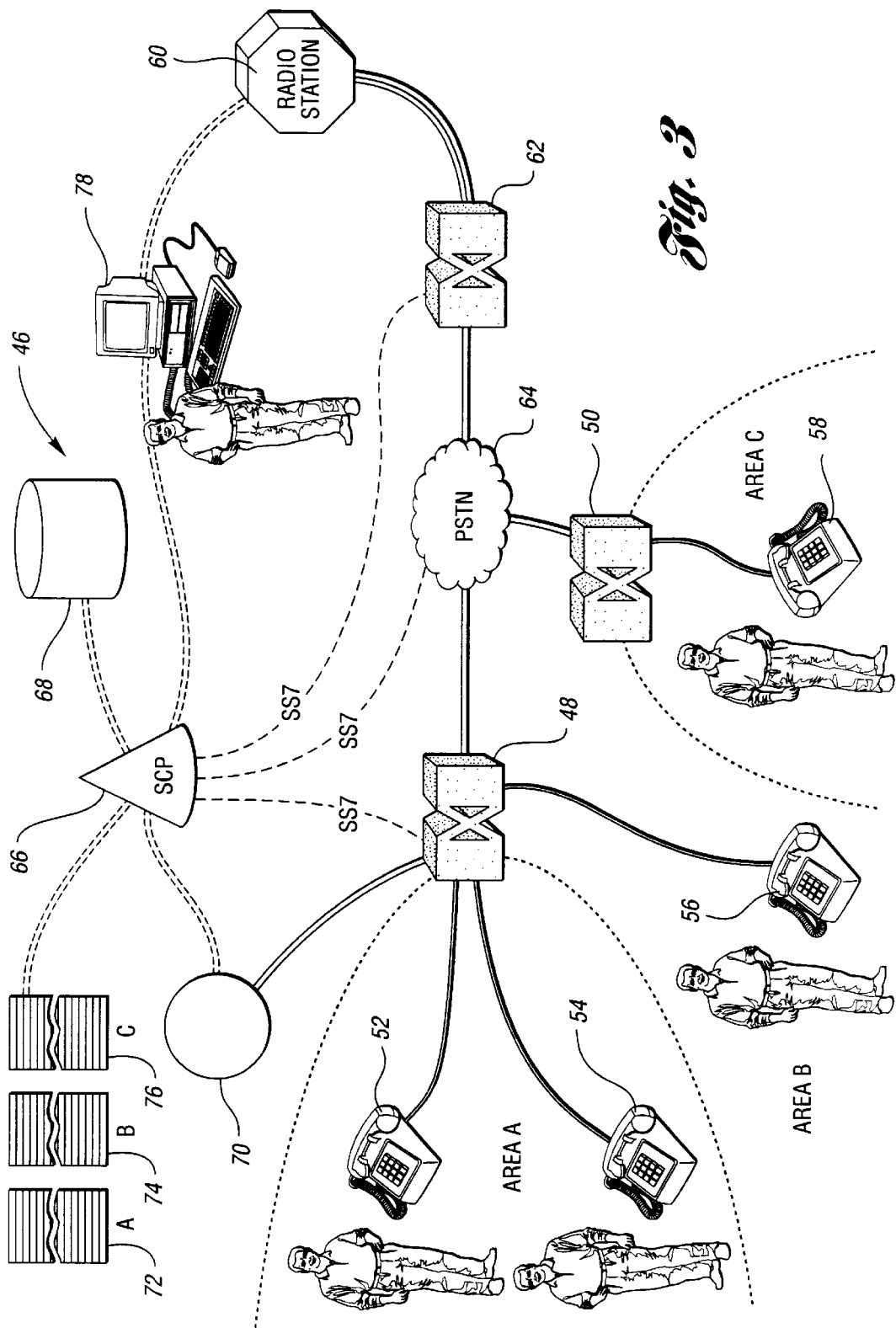
FIG. 3 is a schematic diagram of an alternative embodiment of the system of the present invention.

Referring now to FIG. 3 of the drawings, an additional alternative embodiment of the present invention is illustrated involving multiple callers from a specific area (or sub-area) and multiple areas. The system of FIG. 3 is designated generally by reference numeral 46 and includes a plurality of switching centers 48 and 50 each provided in communication with at least one calling party. As shown, switching center 48 is thus provided in communication with calling party 52, 54 and 56. Switching center 50 is provided in communication with calling party 58. In contrast to the embodiments of FIGS. 1 and 2, three additional callers are shown in system 46, namely, caller 54 has been added to area "A", caller 56 has been added to new area "B", and caller 58 has been added to new area "C" off of new switching center 50.

Again, switching centers 48 and 50 are provided in communication with call response center 60. Switching centers 48 and 50 may be provided directly in communication with call response center 60 or via an additional switching center 62 such as, for example, an answering point terminating end office. Like the embodiments of FIGS. 1 and 2, switching centers 48, 50 and 62 communicate with one another via the Public Switched Telephone Network (PSTN) 64 or other suitable network interface.

In FIG. 3, an adjunct processor, namely SCP 66, is further provided in communication with switching centers 48, 50 and 62. As in the embodiment of FIG. 2, it is contemplated that the SCP 66 will be provided in communication with switching centers 48, 50 and 62 via SS7 protocol or other suitable messaging protocol and system. In this embodiment, call regulating functionality will reside at or in communication with the SCP 66. A routing or mapping database (DB) 68 or other suitable look-up table is also provided as well as an interactive voice response unit (VRU) 70 and at least one call holding queue for each calling area, namely, queue 72 for calling area "A", queue 74 for calling area "B", and queue 76 for calling area "C". Again, these components may reside at or in communication with the SCP 66.

As in FIG. 1, the alternative embodiments of FIGS. 2–3 contemplate that each area or sub-area may be customizable and definable by the customer (typically a service provider administrator). In addition, with the IN or implementation described above, calls may be regulated at their point of origination, namely, the originating switching centers. This, of course, saves both inter-office public network trunks and also keeps open terminating lines to the customer until the next call from a remote area is regulated through.

Operation

The operation of the above-described systems will now be discussed with specific reference to FIG. 3. When a caller such as, for example, calling party 52, dials a destination number for a service provider such as, for example, an emergency 911 PSAP, ticket service, radio station, etc., that call encounters a suitable IN or AIN trigger which is preferably, but not necessarily, programmed on the caller's originating switching center 48 or other suitable switch. Switching center 48 thereafter transfers call processing to the adjunct processor 66.

In keeping with the invention, each calling party and, more particularly, each customer premises equipment (CPE) device associated with the calling party and connected to the switching center 48 is assigned in advance a telephone number or other suitable identifier. Each customer response center 60 of each service provider is also assigned at least one, and preferably a plurality of calling areas. Finally, each switching center 48 is assigned at least one calling area (for each service provider) which includes one, and typically many, calling party CPE devices. Upon receipt of the query from switching center 48, adjunct processor 66 uses the called number to determine the specific service provider called, e.g. 911, utility, etc. The caller's telephone number (calling party number) is then used to determine what area or sub area, etc., the caller is located in for this service provider. Finally, based on the determined calling area, the specific call response center for the calling party and this service provider is determined. The determined call response center may have the same or different calling number from that dialed by the calling party.

As indicated above, by using a routing and mapping data base 68 or other suitable look-up table or functionality, the adjunct processor 66 may easily determine the assigned calling area or sub-area, as the case may be, based on the identified calling party number or identifier. Predetermined parameters, such as those referenced above, as well as a pre-determined regulating algorithm, will be accessible by the call regulating functionality. Based on the current values of these parameters and the regulating algorithm, the adjunct processor 66, and in particular, the call regulating functionality may determine whether to proceed with the call to the call response center 60. As part of this determination, the number of available lines from the switching center 62 serving the call response center 60 may also be considered.

If it is determined, in accordance with the regulating algorithm, that the call should be routed to the call response center 60, the adjunct processor 66 will instruct the switching center 48 to proceed with the call to the call response center 60.

Still referring to FIG. 3, when the call is received by the customer's terminating switching center 62 and answered at the customer's premise, the Public Switched Telephone Network 64 signals the adjunct processor 66 with a message indicating that the call has been answered. It is contemplated that this task might be accomplished with a signal from the originating switching center 48 or, alternatively, from the terminating switching center 62 to the adjunct processor 66. The adjunct processor 66, and more specifically, the call regulating functionality, will, in turn, mark the call as "active" counting it against the threshold parameters for that originating area or sub-area, etc. When either the originating caller or the answering party hangs up and thereby ends the call, the network will send yet another signal message to the adjunct processor 66. At this point, the adjunct processor 66 will mark the call as "inactive—done" and decrement the count of currently active calls for that originating area or sub-area.

The call regulating functionality described above associates a threshold parameter for the maximum number of simultaneous active calls for each area. Areas are grouped together for each customer region. These thresholds can be pre-scheduled based on hours of the day, days of the week, days of the month, or other relevant scheduled time frames.

In addition, default schedules can be overridden with a priority event schedule for special events. All schedules can also be manually overridden with real time changes to respond to mass emergencies such as, for example, earth quakes, tornados, etc.

The call regulating functionality associates the capacity parameter for the total number of physical working telephone circuits for each service provider region. This parameter is used by the call regulating algorithm and the customer personnel to determine area and sub-area threshold values. In operation, the call regulating functionality associates a threshold parameter for the minimum number of open lines terminating to the customer at any point in time.

For example, in the case of emergency calls, a PSAP may serve 4 areas A, B, C and D within its region. The PSAP would want to keep some lines open for possible emergencies in areas C and D even if areas A and B are at their maximum threshold for incoming emergency calls. In this example, each area might have 2 calls set as the maximum number of simultaneous calls for a total of eight. The PSAP, however, might only have six terminating lines. If areas A and B are thus experiencing multiple emergencies and are at their respective maximums of 2 calls each and area C subsequently generates multiple emergency calls, all of the terminating lines could be consumed, thereby leaving no lines open for area D. This threshold parameter would therefore specify the minimum number of open lines terminating to the customer at any point in time. The call regulating functionality would similarly arbitrate between complying with this parameter and allowing each area to reach its maximum number of simultaneous calls.

In keeping with the invention, default values for the threshold could also be set based on the schedule of options detailed above. In addition, this parameter could be manually overridden or overridden by the regulating algorithm based on input rules to the call regulating functionality.

The call regulating functionality determines how to handle each new call to the customer. Based on the current number of active calls for an area, the current call threshold for that area, and the call regulating algorithm, the call regulating functionality will signal the originating switching center to deliver the call to the appropriate call response center, return an appropriate indicator such as, for example, a busy tone or announcement indicating that all allocated circuits for that customer area are in use, or ask the caller to hold and play a voice message. Such a message would be generated using an interactive voice response unit as disclosed above to the originating caller describing a situation.

For example, for emergency situations, the caller might be advised that she has reached the 911 service provider and that a high volume of calls are being experienced at that time. The caller would be advised to hold and the next available agent will respond. A similar message might be provided for use by a ticket ordering service. For example, a customer could be advised that she has reached the desired call response center and that she is the nth customer in queue from her area. The customer would be advised to stay on hold and an agent will take her order in turn.

By allowing a caller to hold, the call regulating functionality will queue each held call and continue to monitor the status of the active calls for that area versus the current threshold parameters. Typically, this will be done on a first-in/first-out (FIFO) basis. Any suitable prioritization method may, of course, however be followed. As soon as the call regulating functionality determines that the active call count falls below the threshold for a specific area, the next designed holding call (at the top of the queue) for that area will be delivered to the call response center. Additional parameters may, therefore, also be referenced. For example, a total of current calls held in queue may be determined. Still further, a threshold of total calls permitted to be held in queue may be included. In keeping with the invention, this latter parameter may be programmed to vary depending on the time of day, day of week, etc. It may also be changed in real-time by the customer.

Because the system monitors queues for each area in real time, it is also able to respond to real time changes in the threshold parameters. In addition, the call regulating functionality monitors the status of callers in the hold queue. The originating (or terminating) switching center signals the call regulating functionality about any callers who disconnect while on hold.

In further keeping with the invention, a human interface 17, 45, or 78 (as shown in FIGS. 1, 2 and 3, respectively) may also be provided through which an administrator at or in communication with a call response center can access the call regulating functionality and define threshold schedules for each area within a specific region, override specific parameters in real-time (to reflect changing community events or stations or situations) and record special incident messages. Such a human interface would allow an administrator to visually monitor (or query) the number of calls currently holding for a specific area. This would allow human intervention to temporarily override the threshold parameters for an area, thereby allowing more (holding) calls through.

It is further contemplated that the call regulating functionality will support one or more specific incident announcements. For example, with emergency 911 calls, when a PSAP begins to receive multiple reports about the same incident such calls would clog incoming circuits in that area so that callers with other emergencies could not get through. Typically, however, a PSAP needs only one report of a major fire, plane crash or similar emergency. It is often the case, however, that multiple calls are received at about the same time regarding the same incident.

In these situations, a person at the PSAP could post a custom announcement to callers in that area informing them that the top incident has already been reported. The message would also direct callers to press a specified digit, e.g., "9" or hold if they are reporting a different emergency. Such a message could be played continuously until the caller responds (presses "9", hangs up, or holds). For example, the caller could be advised that she has reached the 911 service provider and if she is calling about a specified incident at a specified address it has already been responded to. If she is calling about a different emergency, she would be prompted to press a digit or hold for the next available agent to respond. In similar fashion, a custom announcement from a call response center of a utility could advise callers that a power outage, gas leak, etc., has already been reported.

Figure 4:
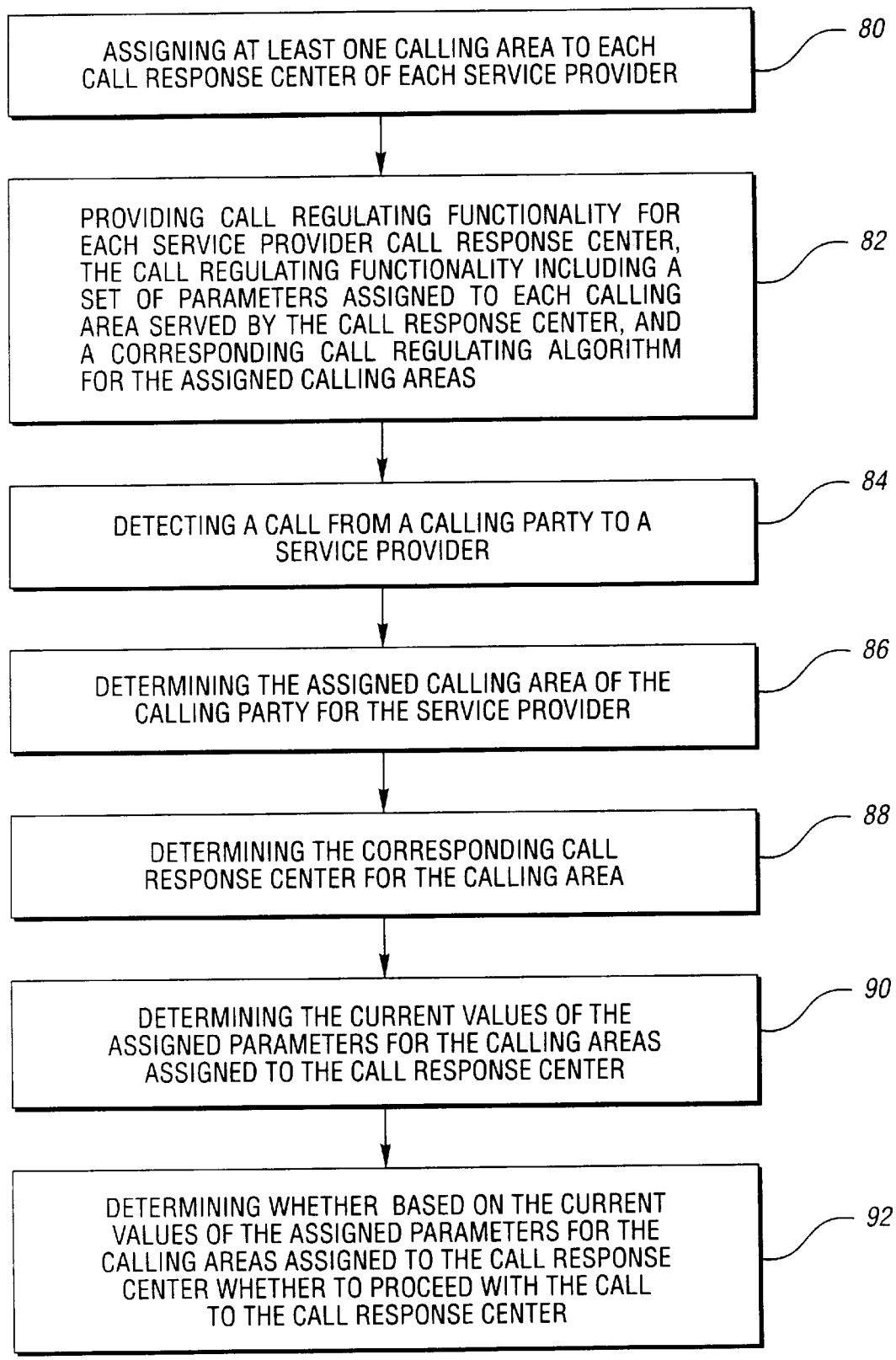
FIG. 4 is a block diagram of the method of the present invention.

The generalized method of the present invention may be further understood with reference to FIG. 4 of the drawings. As disclosed, the method is specifically directed for use in a communications network having at least one switching center serving at least one calling party and at least one call response center. The method comprises assigning 80 at least one calling area to each call response center of each service provider. Call regulating functionality is further provided 82 in communication therewith. The call regulating functionality includes a set of parameters assigned to each calling area served by each call response center as well as a corresponding call regulating algorithm for the assigned calling areas for each service provider.

The method further comprises detecting 84 a call from a calling party to a service provider, determining 86 the assigned calling area of the calling party for that service provider and determining 88 the corresponding call response center for that calling area. Still further, the method includes determining 90 the current values of the assigned parameters for the calling areas assigned to the call response center. Finally, the method includes determining 92 based on the current values of the assigned parameters, and the call regulating algorithm, whether to proceed with the call to the call response center.

The implementations of this invention described above provide a number of advances over the prior art. These advances benefit callers and customers like a ticket ordering service, a 911 PSAP, or a local utility and the resources in the Public Switched Telephone Network. Because regulating of calls is typically performed at the caller's originating end office, trunk circuits are not used between that office and the terminating office answering point until an allocated line is available into the answering point. This dynamic processing capability which uses threshold parameters for each area within a region benefits both callers and answering point personnel. It allows real life and real-time response to changing situations (e.g., 911 unfolding emergencies, by temporarily adjusting threshold values) and pre-scheduled responses to anticipated events.

The above-described invention allows the control of calls that reach call response center personnel for a service provider. For ticket services, radio station contest lines, and other customer service centers, this threshold regulating capability allows equitable access for all callers throughout the defined region. The above-described implementations using the IN and AIN are also centralized thereby facilitating a single-point of administration and secured access. Most importantly, no additional hardware or software enhancements are required at each answering point for the IN or AIN implementation.

While the best modes for carrying out the invention has been described in detail, those familiar with the art to which this invention relates will recognize various alternative designs and embodiments for practicing the invention as defined by the following claims.

What is claimed is:

1. For use in a communications network having at least one service provider with at least one call response center, and at least one switching center serving at least one calling party, a method of regulating the flow of calls, the method comprising:

assigning at least one calling area to each call response center;

providing call regulating functionality in communication with each call response center of each service provider, the call regulating functionality including a set of parameters assigned to each calling area served by the call response center, and a corresponding call regulating algorithm for the assigned calling areas;

detecting a call from a calling party to a service provider;

determining the assigned calling area of the calling party for the service provider;

determining the call response center for the calling party and the service provider;

determining the current values of the assigned parameters for the calling areas assigned to the call response center; and determining based on the current values of the assigned parameters, and the call regulating algorithm, whether to proceed with the call to the call response center.

2. A method as in claim 1, further comprising assigning a calling number to each calling party, the calling number indicative of the assigned calling area for the calling party and the service provider.

3. A method as in claim 2, wherein the calling number is a telephone number.

4. A method as in claim 2, wherein the step of determining the assigned calling area of the calling party further comprises determining the service provider called by the calling party and the calling party's number.

5. A method as in claim 1, wherein the call regulating functionality is provided in communication with at least one adjunct processor serving each call response center of each service provider.

6. A method as in claim 5, wherein the call regulating functionality resides at the at least one adjunct processor.

7. A method as in claim 5, wherein the communications network is an Intelligent Network (IN).

8. A method as in claim 5 wherein the communications network is an Advanced Intelligent Network (AIN) and the adjunct processor is a service control point (SCP).

9. A method as in claim 1, wherein the call regulating functionality resides at the at least one call response center.

10. A method as in claim 1, wherein the call regulating functionality resides at the at least one switching center.

11. A method as in claim 1, wherein the at least one switching center is an originating end office.

12. A method as in claim 1, wherein the at least one switching center is a packet switched office.

13. A method as in claim 1, wherein the assigned parameters include a total number of currently active calls for each calling area assigned to the call response center.

14. A method as in claim 1, wherein the assigned parameters include a threshold of currently active calls permitted for each calling area assigned to the call response center.

15. A method as in claim 14, wherein different thresholds may be programmed for the same calling area based on time of day, day of week, and/or planned events.

16. A method as in claim 14, wherein the threshold may be changed in real time by a call response center attendant or administrator.

17. A method as in claim 1, wherein the call regulating functionality is operative to count the total number of currently active calls for each calling area.

18. A method as in claim 17, wherein the call regulating functionality is operative to increment the total number of currently active calls each time a call is routed from the calling area to the call response center.

19. A method as in claim 17, wherein the call regulating functionality is operative to decrement the total number of currently active calls each time a call from the calling area that was routed to the call response center ends.

20. A method as in claim 1 further comprising an interactive voice response unit and voice announcements to the calling party.

21. A method as in claim 1, further comprising assigning a queue for each calling area assigned to each call response center.

22. A method as in claim 20, wherein the assigned parameters include a total number of currently pending calls held in each queue.

23. A method as in claim 20, wherein the assigned parameters include a threshold of total calls permitted to be held in each queue.

24. A method as in claim 23, wherein different thresholds may be programmed for each queue based on time of day, day of week, and/or planned events.

25. A method as in claim 23, wherein the threshold may be changed in real time by a call response center attendant or administrator.

26. A method as in claim 20, further comprising determining if there are any calls in the queue.

27. A method as in claim 26, further comprising determining whether to proceed with a call in the queue to the call response center.

28. A method as in claim 20 wherein the call regulating functionality is operative to count the total number of currently pending calls held in queue for each calling area.

29. A method as in claim 28 wherein the call regulating functionality is operative to increment the total number of currently pending calls held in queue each time a call is received by the queue.

30. A method as in claim 28 wherein the call regulating functionality is operative to decrement the total number of currently pending calls held in queue each time a call is forwarded from the queue to the call response center.

31. A method as in claim 20, wherein the queue is operative to route calls to the call response center on a first in, first out, (FIFO) basis.

32. For use in a communications network having at least one service provider with at least one call response center, and at least one switching center serving at least one calling party, a method of regulating the flow of telephone calls, the method comprising:

assigning at least one calling area to each switching center;

providing call regulating functionality in communication with each call response center of each service provider, the call regulating functionality including a set of parameters assigned to each calling area served by the call response center, and a corresponding call regulating algorithm for the assigned calling areas;

detecting a call from a calling party to a call response center;

determining the assigned calling area of the calling party for the service provider;

determining based on the calling area of the calling party, the call response center for the calling party and the service provider, and the switching center serving the call response center;

determining the current number of communication lines available for use from the switching center serving the call response center;

determining the current values of the assigned parameters for the calling areas assigned to the call response center; and determining, based on the current number of communication lines available for use from the switching center serving the call response center, the current values of the assigned parameters, and the call regulating algorithm, whether to proceed with the call to the call response center.

33. For use in a communication network, a system for regulating the flow of calls to a service provider, the system comprising:

at least one switching center serving at least one calling party;

at least one call response center, each call response center having at least one calling area assigned thereto; and a call regulator provided in communication with each call response center, the call regulator including a set of parameters assigned to each calling area served by the call response center, and a corresponding call regulating algorithm for the assigned calling areas, whereby the call regulator is operative to detect a call from a calling party to a call response center, determine based on the calling area of the calling party the call response center, determine the current values of the assigned parameters for the calling areas assigned to the call response center, and determine based on the current values of the assigned parameters, and the call regulating algorithm, whether to proceed with the call to the call response center.

34. The system as in claim 33 wherein the call regulator is provided at or in communication with the switching center.

35. The system as in claim 33 wherein the call regulator is provided at or in communication with the call response center.

36. The system as in claim 33 wherein the call regulator is provided at or in communication with an adjunct processor.

37. The system as in claim 36 wherein the adjunct processor is implemented in an Intelligent Network (IN) or Advanced Intelligent Network (AIN).

38. The system as in claim 36 wherein the adjunct processor comprises a service control point (SCP).

39. The system as in claim 33 further comprising at least one queue for each calling area assigned to each call response center.

40. A system as in claim 33 wherein the call regulator includes a parameter corresponding to the total number of currently active calls for each calling area assigned to the call response center.

41. A system as in claim 33 wherein the call regulator includes a parameter corresponding to a threshold of currently active calls permitted for each calling area assigned to the call response center.

42. A system as in claim 41 wherein the parameter corresponding to a threshold of currently active calls permitted for each calling area assigned to the call response center may be programmed with different settings for time of day, day of week, and/or planned events.

43. A system as in claim 41 wherein the parameter corresponding to a threshold of currently active calls permitted for each calling area assigned to the call response center may be changed in real-time by a call response center attendant or administrator.

44. A system as in claim 33 wherein the call regulator is operative to count the total number of currently active calls for each calling area.

45. A system as in claim 44 wherein the call regulator is operative to increment the total number of currently active calls each time a call is routed from the calling area to the call response center.

46. A system as in claim 44 wherein the call regulator is operative to decrement the total number of currently active calls each time a call from the calling area to the call response center ends.

47. For use in a communications network having at least one service provider with at least one call response center, and at least one switching center serving at least one calling party, a method of regulating the flow of calls, the method comprising:

providing call regulating functionality in communication with each call response center of each service provider, the call regulating functionality including a set of parameters assigned to each calling area served by the call response center, and a corresponding call regulating algorithm for the assigned calling areas;

detecting a call from a calling party to a service provider;

determining the call response center for the calling party and the service provider;

determining the current values of the assigned parameters for the calling areas assigned to the call response center; and, determining based on the current values of the assigned parameters, and the call regulating algorithm, whether to proceed with the call to the call response center.

* * * * *